United States Patent
Cizek et al.

(10) Patent No.: US 9,141,128 B2
(45) Date of Patent: Sep. 22, 2015

(54) PEDAL VALVE SENSOR ARRANGEMENT

(75) Inventors: Vaclav Cizek, Plana nad Luznici (CZ); Dusan Falar, Vodnany (CZ)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/818,745

(22) PCT Filed: Aug. 3, 2011

(86) PCT No.: PCT/EP2011/063343
§ 371 (c)(1),
(2), (4) Date: Aug. 9, 2013

(87) PCT Pub. No.: WO2012/025350
PCT Pub. Date: Mar. 1, 2012

(65) Prior Publication Data
US 2013/0305873 A1    Nov. 21, 2013

(30) Foreign Application Priority Data

Aug. 25, 2010   (DE) .......................... 10 2010 039 771
Aug. 2, 2011   (DE) .......................... 10 2011 080 297

(51) Int. Cl.
*G05G 1/30* (2008.04)
*F16F 3/02* (2006.01)
(Continued)

(52) U.S. Cl.
CPC ................ *G05G 1/44* (2013.01); *B60K 26/021* (2013.01); *G05G 1/40* (2013.01); *G05G 1/405* (2013.01); *G05G 1/42* (2013.01); *G05G 1/445* (2013.01); *Y10T 74/20528* (2015.01)

(58) Field of Classification Search
CPC ............ G05B 1/40; G05B 1/42; G05B 1/445; G05B 1/44; G05B 1/405; B60K 26/021; Y10T 74/20528

USPC ............ 74/478, 512–514; 267/151, 158, 160; 200/61.89, 86.5
See application file for complete search history.

(56) References Cited

U.S. PATENT DOCUMENTS 7,028,577 B2 *   4/2006 Kato et al. ...................... 74/478
8,789,441 B2 *   7/2014 Khan et al. ...................... 74/512
(Continued)

FOREIGN PATENT DOCUMENTS

CN   201201519 Y   3/2009
DE   199 18 119 A1  10/2000
(Continued)

OTHER PUBLICATIONS

International Search Report corresponding to PCT Application No. PCT/EP2011/063343, mailed Dec. 6, 2011 (German and English language document) (7 pages).

*Primary Examiner* — Thomas R. Hannon
*Assistant Examiner* — Adam D Rogers
(74) *Attorney, Agent, or Firm* — Maginot, Moore & Beck LLP

(57) ABSTRACT

A pedal value sensor arrangement for a motor vehicle includes a pedal movable between an idle position and an end position, a bearing for the pedal, and a spring configured to apply a restoring force to the pedal towards the idle position. In an intermediate position between the idle position and the end position, the spring is configured to apply a restoring force to the pedal toward the idle position that is greater than before and/or after the intermediate position, wherein the greater restoring force of the spring is brought about by a contact of a first section of the spring with a second section of the spring.

14 Claims, 5 Drawing Sheets

(51) Int. Cl.
  *G05G 1/44*    (2008.04)
  *B60K 26/02*   (2006.01)
  *G05G 1/40*    (2008.04)
  *G05G 1/405*   (2008.04)
  *G05G 1/42*    (2008.04)
  *G05G 1/445*   (2008.04)

(56) References Cited

U.S. PATENT DOCUMENTS

2008/0258366 A1* 10/2008 Tuttle .......................... 267/158
2009/0071286 A1*  3/2009 Ueno et al. ..................... 74/513

FOREIGN PATENT DOCUMENTS

| | | |
|---|---:|---|
| DE | 100 10 432 A1 | 9/2001 |
| DE | 10 2004 002 113 A1 | 8/2005 |
| DE | 20 2004 008 486 U1 | 11/2005 |
| DE | 10 2004 060 482 A1 | 6/2006 |
| DE | 10 2005 038 750 A1 | 2/2007 |
| EP | 0 033 761 B1 | 8/1981 |
| EP | 1 233 320 A2 | 8/2002 |
| FR | 2 847 356 A1 | 5/2004 |
| JP | 56-99824 A | 8/1981 |
| JP | 56-146628 A | 11/1981 |
| JP | 58-73035 U | 5/1983 |
| JP | 2005-75162 A | 3/2005 |

\* cited by examiner

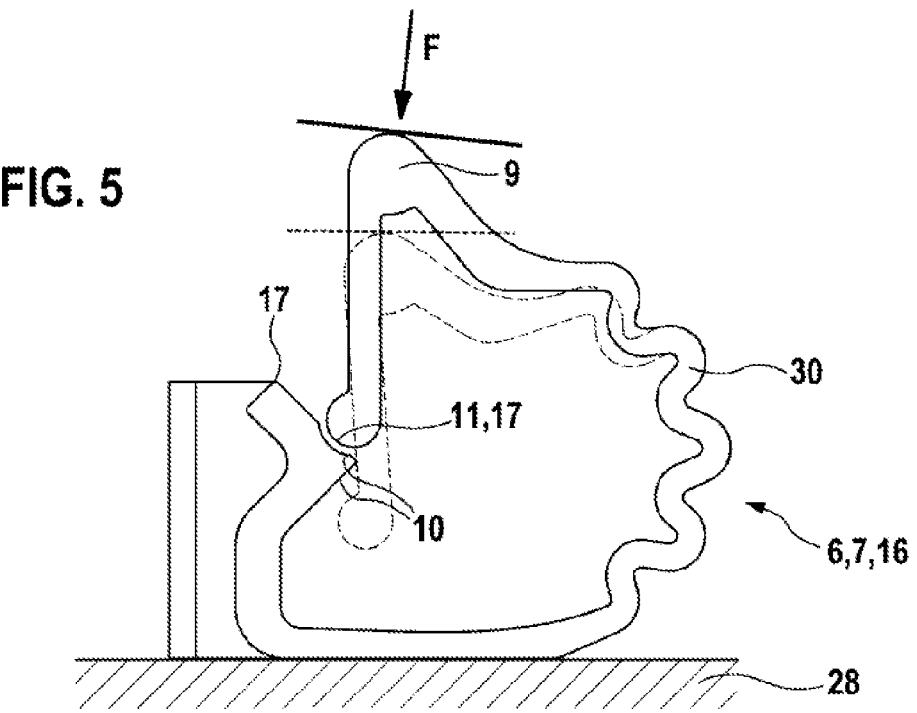
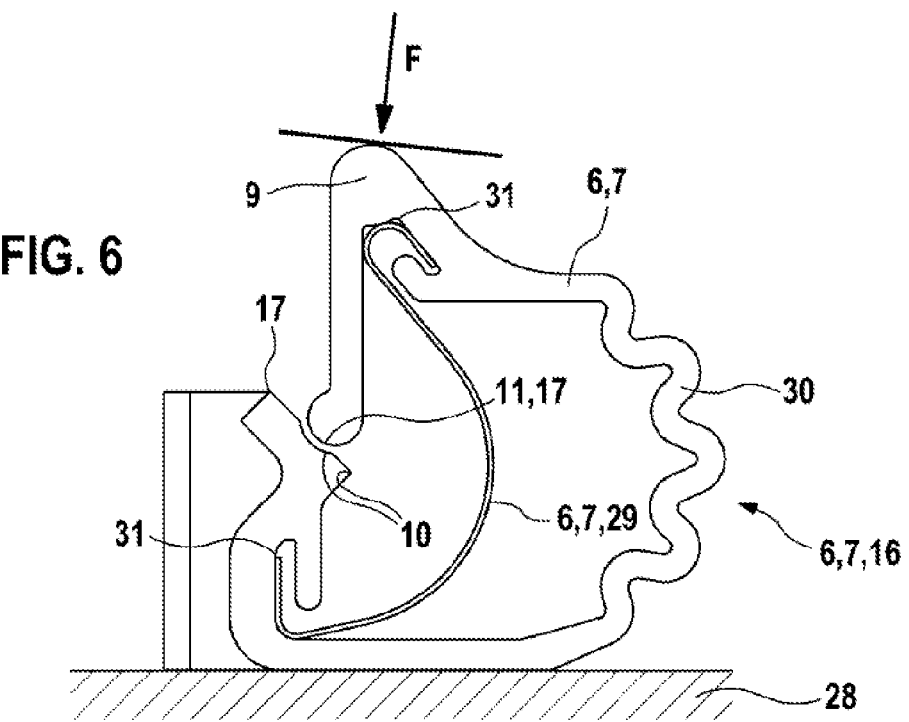

PEDAL VALVE SENSOR ARRANGEMENT

This application is a 35 U.S.C. §371 National Stage Application of PCT/EP2011/063343, filed on Aug. 3, 2011, which claims the benefit of priority to Serial No. DE 10 2010 039 771.7, filed on Aug. 25, 2010 in Germany and Serial No. DE 10 2011 080 297.5, filed on Aug. 2, 2011 in Germany, the disclosures of which are incorporated herein by reference in their entirety.

The present disclosure concerns a pedal value sensor arrangement according to the description below.

BACKGROUND

In motor vehicles, in particular in motor vehicles with automatic transmission, it is frequently necessary for an electrical shift signal to be generated on firm pressing of a pedal as a gas or drive pedal. In particular on firm pressing of the drive pedal, with the desired strong acceleration of the motor vehicle, thereby the automatic transmission should automatically downshift to the next lower gear stage. For this a corresponding shift signal is required in an intermediate position of the pedal between a rest position and an end position. To avoid undesirable downshifting of the automatic transmission, at the position—i.e. the intermediate pedal position—at which the electric shift point is to be triggered, a mechanical resistance perceptible to the driver should be present, i.e. a clearly perceptible increase in the force at the drive pedal. Such a shift point or shift region in the intermediate position of the pedal is also known as kick-down shift.

DE 10 2005 038 750 A1 shows a kick-down device of a drive pedal module of a motor vehicle which contains a drive pedal which is mounted on a bearing block and can be displaced between a rest position and an end position, wherein the kick-down device has at least one activation element which is axially guided in a recess of the drive pedal or bearing block and has at least one active edge. Furthermore the kick-down device is fitted with a key element which is axially guided in the recess and cooperates with the activation element via at least one roller body and is loaded by at least one compression spring, wherein on activation of the drive pedal up to a defined point, the activation element can be pressed axially into the recess and by its active edge the at least one roller body can be pressed radially out of a transverse recess of the recess and against the key surface of the key element.

DE 100 10 432 A1 shows a kick-down element for a drive pedal module of a vehicle with a housing and an activation element which is axially guided in the housing and is axially displaceable against the force of a return spring and carries two diametrically arranged roller bodies which, on insertion of the activation link into the housing, to increase the displacement force, are pressed away against the force of a U-shaped curved leaf spring over an over-pressure edge, wherein the roller bodies are held in diametrically opposed bearing shells, wherein the leaf spring with two longitudinal spring legs and a cross web connecting these is fixed with its cross web on the floor of the housing and lies with its spring legs under pretension on the bearing shells so that on insertion of the activation element, the roller bodies slide on the outsides of the spring legs facing away from each other, and wherein the over-pressure edges are formed on the face leg ends of the spring legs.

DE 199 18 119 A1 discloses a pedal value sensor arrangement with a pedal which is mounted on the chassis of a motor vehicle and is displaceable between a rest position and an end position. In an intermediate position between the rest position and the end position of the pedal, a tensioning return spring arrangement presses the pedal in the direction of the rest position. Furthermore the pedal value sensor arrangement has a force change device.

DE 10 2004 060 482 A1 discloses a kick-down element for a drive pedal sensor. This comprises a carrier and a housing arranged displaceably in relation to the carrier, wherein between the carrier and the housing is provided an arrangement to generate a force step with a first arm and a second arm, with an allocated first contact surface and an allocated second contact surface, wherein the contact surfaces have different contours.

SUMMARY

A pedal value sensor arrangement according to the disclosure, comprising a pedal movable between a rest position and an end position as a drive or gas pedal, preferably a bearing for the pedal, a spring which applies a return force to the pedal in the direction of the rest position, and in an intermediate position between the rest position and end position, the spring can apply a greater return force to the pedal in the direction of the rest position than before and/or after the intermediate position, wherein the greater return force of the spring occurs by virtue of a contact of a first segment of the spring with a second segment of the spring. In the intermediate position a greater return force acts, or a force step of the return force applied by the spring to the pedal as a gas pedal. The greater return force is made available or occurs by virtue of a contact between the first and the second segment of the spring, so that the pedal value sensor arrangement is formed constructionally simply with few components, because the force step or greater return force can be provided by the spring alone without additional components being required here to generate the force step or greater return force. The intermediate position is a point in the pedal position or a region of the pedal position. If the pedal for example is mounted pivotably about a pivot axis, the intermediate position constitutes either a particular rotation angle of the pedal or the intermediate position is a rotation angle range, for example a range of 5° or 10°, of the pedal. The spring constitutes a kick-down spring which applies the return force to the pedal only in a part region of the pedal position between the rest position and the end position, and this part region is preferably delimited by the end position or lies close to the end position, so that preferably in one region of the pedal position, at the rest position, the spring does not or cannot apply any return force on the pedal.

In a further embodiment the pedal value sensor arrangement comprises at least one return spring, preferably two return springs, which applies a return force on the pedal in the direction of the rest position in order to move the pedal to the rest position. The at least one return spring applies a return force to the pedal in all positions of the pedal between the rest position and the end position. In contrast the spring as a kick-down spring applies a return force to the pedal only in a part region of the pedal position, in particular a part region which is delimited by the end position or lies close to the end position. The main task of the spring is therefore not to move the pedal to the rest position, but in pedal positions in the region of the end positions, at an intermediate position, to generate a greater return force or force step.

In an additional embodiment the greater return force can be applied or made available exclusively by the spring.

In a variant the pedal value sensor arrangement has, apart from the spring, no additional components, mechanism or kinematic to generate the greater return force, wherein preferably the at least one return spring is not taken into account here.

In a further embodiment the geometry of the spring in the intermediate position causes an additional deformation of the spring and the additional deformation of the spring causes the greater return force, wherein the additional deformation is a deformation which differs from the deformation of the spring on a movement of the spring outside the intermediate position. The additional deformation here constitutes a supplementary deformation of the spring which occurs in addition because of the movement of the pedal or the movement of the spring. The additional deformation occurs exclusively only in the intermediate position of the pedal, so that the additional deformation and hence the greater return force is present only in the intermediate pedal position. The additional deformation is for example a deformation of the spring in the region of a protuberance and/or a deformation of the spring between the protuberance and a second end.

Suitably the contact between the first segment of the spring and the second segment of the spring causes friction forces and the friction forces cause the greater return force. Here the friction forces are preferably only a small part of the greater return force.

In one variant the spring is kinematically coupled with the pedal so that on movement of the pedal, the first segment of the spring executes a relative movement in relation to the second segment of the spring.

In an additional embodiment the geometry of the spring, on the contact and relative movement between the first segment of the spring and the second segment of the spring, causes the additional deformation of the spring and the spring therefore constitutes a spring kinematic.

Preferably the additional deformation is a bending of the spring.

In an additional embodiment, in a position of the pedal between the rest position and the intermediate position, there is no contact between the first and second segments of the spring, and/or in the intermediate position of the pedal, contact is made between the first and second segments of the spring, and/or in a position of the pedal between the intermediate position and the end position, contact is made or there is no contact between the first and second segments of the spring.

In particular the pedal is mechanically coupled with the spring by means of a kinematic or a mechanism and/or the pedal is mounted pivotable about a pivot axis. Preferably the kinematic or mechanism converts a rotation movement of the pedal into a translation movement of a component, in particular a cylinder, of the kinematic or mechanism. The component, in particular the cylinder, preferably lies on the spring and this component transmits the return force to the pedal. In addition the kinematic or mechanism preferably has a translation ratio so that a relative movement of the pedal is greater or smaller, and stands in a specific ratio to a relative movement of the spring or component, in particular the cylinder, of the kinematic or mechanism.

In one variant the spring is a leaf spring and/or the spring is substantially formed as an interrupted ring with two ends and the first and second segments of the spring are formed in the region of the two ends and/or the pedal value sensor arrangement comprises only one spring, wherein the return spring is not taken into account, so that a pedal value sensor arrangement with one spring and two return springs comprises only one spring as a kick-down spring. The first segment and the second segment are preferably situated at a distance from the end of the ring of less than 40%, 30%, 20% or 10% of the ring length. The first segment therefore has this distance from a first end and the second segment has this distance from a second end of the ring. The ring here can have different geometric forms, for example as well as an approximately circular design the ring can also have other geometries for example square, triangular, and preferably has protuberances or bulges. A substantially square ring thus substantially forms a square and the square is interrupted at one point and the two ends are situated at this interruption of the square ring.

In a further variant the pedal value sensor arrangement has a sensor, in particular an electrical contact, an inductive sensor or light barrier, to detect the intermediate position of the pedal. The sensor can detect the pedal intermediate position and thus the control unit of the motor vehicle can achieve a downshift of an automatic transmission into one or more next lower gear stages.

Suitably the spring consists at least partly, in particular completely of metal e.g. steel, aluminum or brass.

In another advantageous embodiment the spring consists at least partly, in particular completely, of plastic.

In a particularly advantageous variant the spring is provided with an undulation, in particular the undulation is formed in a part region between the first segment and the second segment. Because of the undulation the spring requires less installation space and/or the spring lowers the spring constant of the spring according to Hooke's law i.e. the spring becomes weaker as a result.

In an advantageous embodiment the spring is formed in two parts with a first spring of plastic and a second spring as an additional spring of metal e.g. steel, aluminum or brass.

In a further embodiment the pedal value sensor arrangement comprises a pedal position sensor to detect the pedal position, and using the pedal position detected by the pedal position sensor, a control unit controls the power of the combustion engine.

BRIEF DESCRIPTION OF THE DRAWINGS

An embodiment example of the disclosure is described in more detail below with reference to the enclosed drawings. Here:

FIG. 5 shows a side view of the spring in a second embodiment example, FIG. 6 shows a side view of the spring in a third embodiment example.

DETAILED DESCRIPTION

Figure 1:
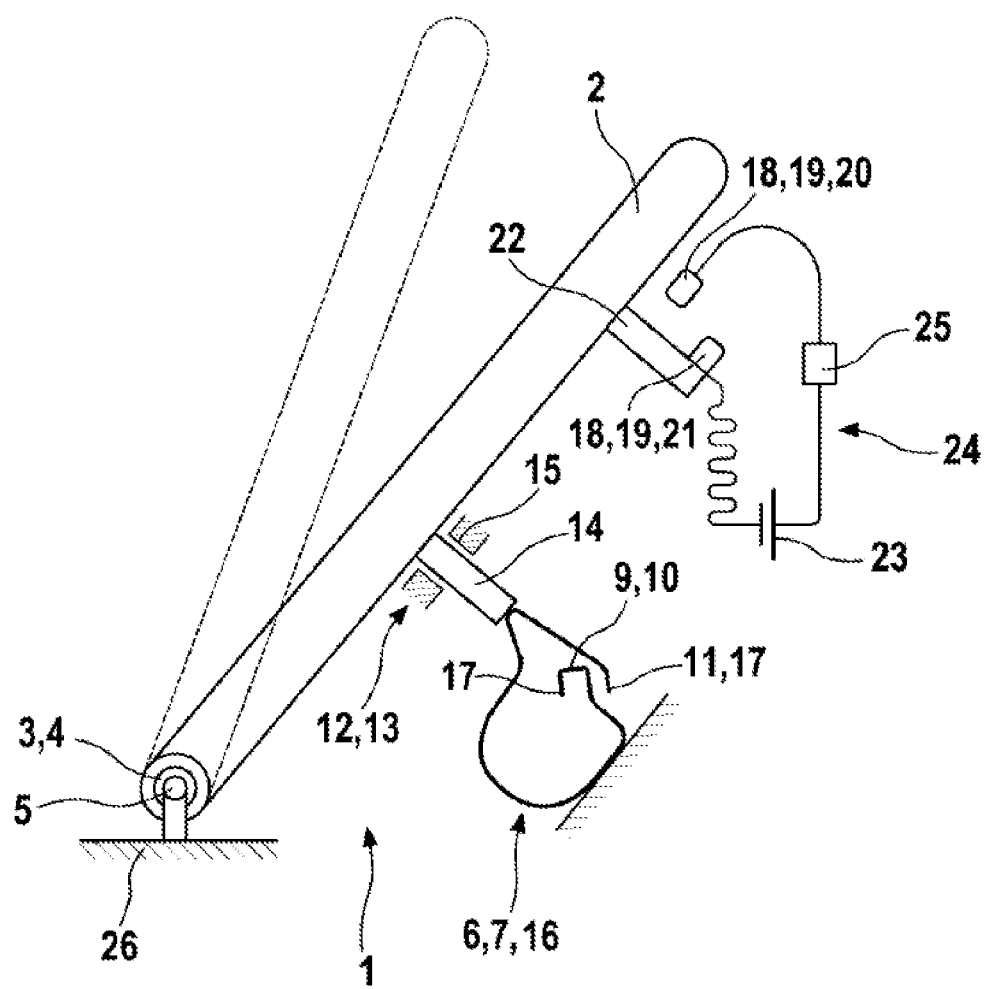
FIG. 1 shows a greatly simplified depiction of a pedal value sensor arrangement.

A pedal value sensor arrangement 1 shown in FIG. 1 is used in a motor vehicle 27 (FIG. 5), for example in connection with an automatic transmission. Here at a pedal 2 of the pedal value sensor arrangement 1, in an intermediate position between a rest position and an end position, a greater return force or force step occurs and the intermediate position of the pedal 2 is detected by the pedal value sensor arrangement 1, so that thus in the intermediate position for example an automatic downshift of the automatic transmission can be achieved by means of a control unit (not shown) of the motor vehicle 27.

The pedal 2 as a gas or drive pedal is mounted pivotably about a pivot axis 5 on a bearing 3, formed as a plain bearing 4. The bearing 3 of the pedal 2 is attached to a chassis 26 of the motor vehicle 27. The pedal 2 can be pivoted about the pivot axis 5 between an end position shown in FIG. 1 and a rest position indicated in dotted lines in FIG. 1. Between the end position and the rest position there is furthermore an intermediate position of the pedal 2. In the end position shown in FIG. 1, by means of a foot (not shown) of a driver of the motor vehicle 27, a force is applied to the pedal 2 and by means of this force a return force of a spring 6 acting on the pedal 2 is overcome. In addition the pedal value sensor arrangement 1 has two return springs (not shown) which move the pedal to the rest position, and their return force must also be overcome by the driver's foot. In the end position the maximum power available from a combustion engine (not shown) of the motor vehicle 27 is demanded, and in the rest position the minimum power. When the driver of the motor vehicle 27 removes his foot from the pedal 2, the pedal 2 moves back to the rest position (indicated in dotted lines) because of the return force applied to the pedal 2 by the return springs (not shown).

Figure 2:
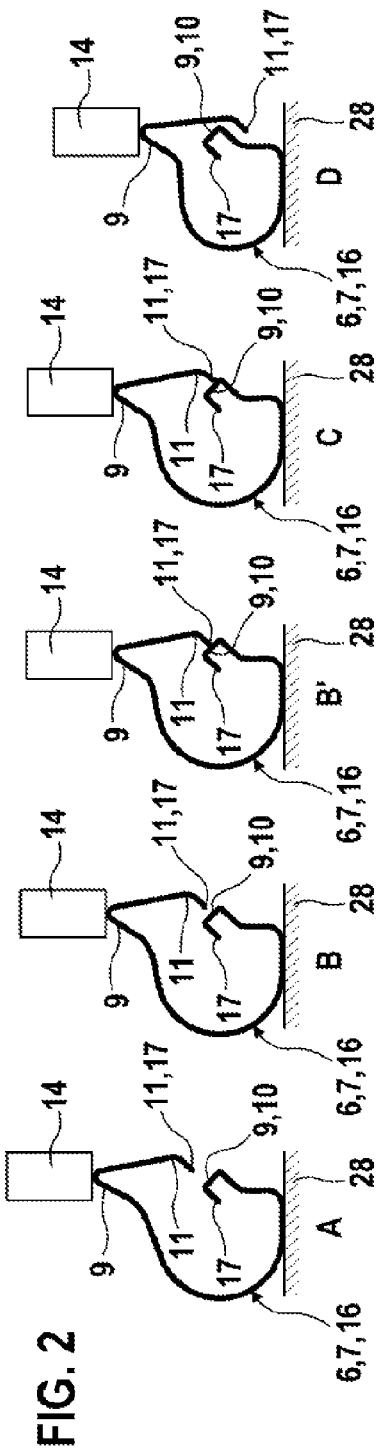
FIG. 2 shows a spring in a first embodiment example and a cylinder in positions A to D of the pedal value sensor arrangement in FIG. 1.

The spring 6, which is made as a leaf spring 7 of metal e.g. steel, aluminum or brass, in a first embodiment example (FIGS. 1 and 2), in the section according to FIGS. 1 and 2, has approximately the form or geometry of an interrupted ring 16. The interrupted ring 16 or spring 6 has two ends 17. In the region of or close to the ends 17, the spring 6 has a first segment 10 and a second segment 11. Furthermore on the first segment 10 of the spring 6, a protuberance 9 is formed. The moveable pedal 2 can act mechanically on the spring 6 via a kinematic 12 or a mechanism 13. When the pedal 2 has covered a specific distance or angle starting from the rest position indicated in dotted lines, on a movement of the pedal 2 a relative movement also occurs between the first segment 10 and the second segment 11 of the spring 6. The kinematic 12 here consists of a piston 14 arranged in a cylinder 15. The cylinder 15 lies at a first end on the pedal 2 and at another end of the cylinder 15 opposite the first on a further protuberance 9 of the spring 6 (FIGS. 1 and 2). Because of the mounting in the cylinder 15, the piston 14 executes merely a translational movement. As a result the rotational movement of the pedal 2—and because of the moveable mounting of the cylinder 14 on the pedal 2, the rotational movement of the pedal 2—is converted into a translational movement of the cylinder 15. The spring 6 can thus exert a return force on the pedal 2 by means of the mechanism 13 or kinematic 12.

Figure 3:
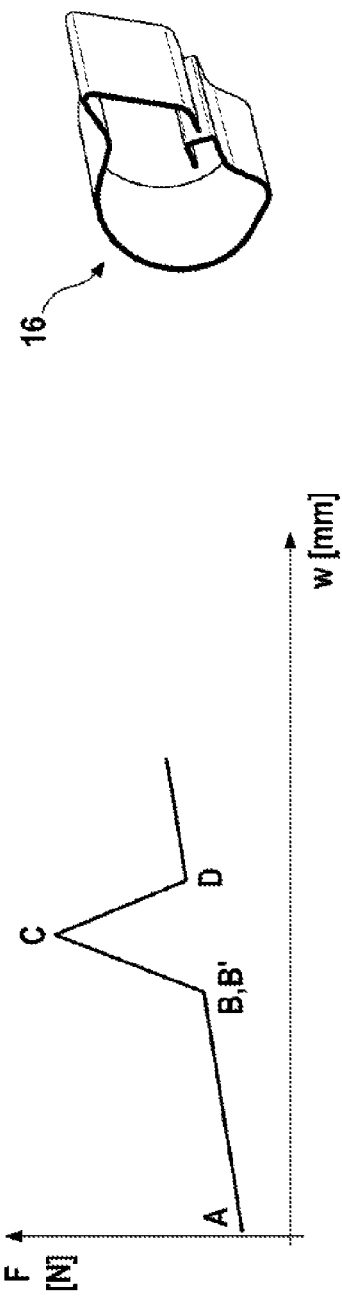
FIG. 3 is a force-travel diagram of the spring according to FIGS. 1 and 2.
Figure 7:
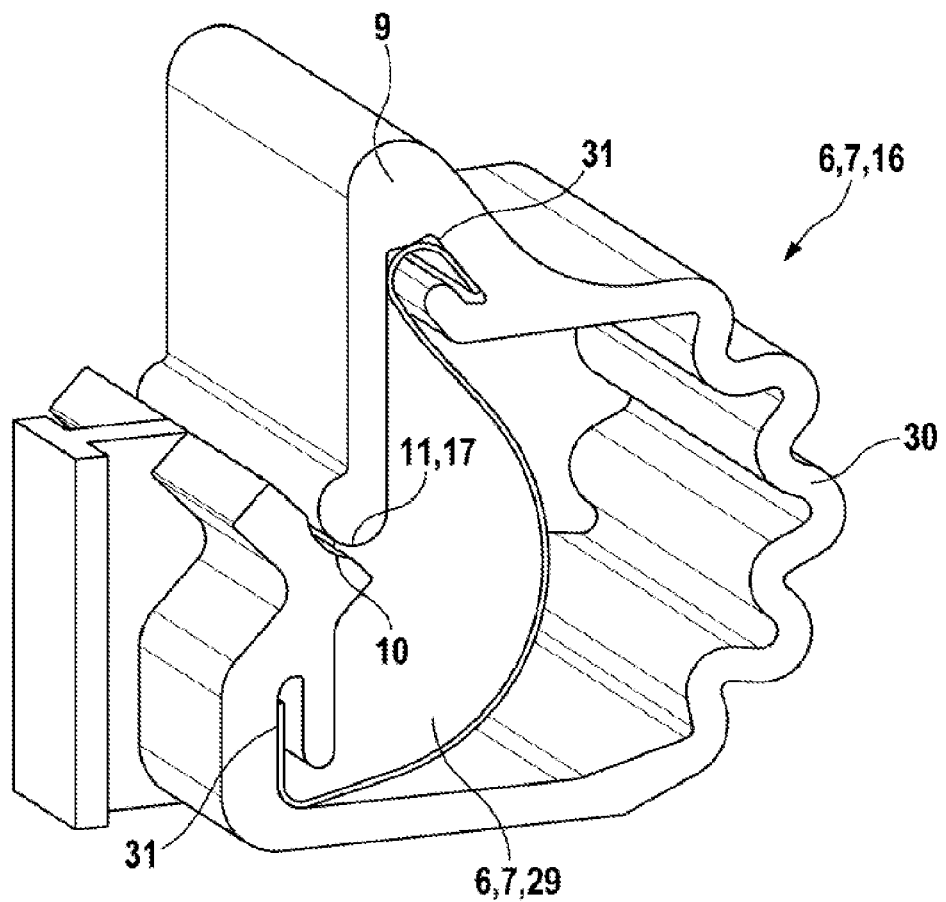
FIG. 7 is a perspective view of the spring in FIG. 6.
Figure 8:
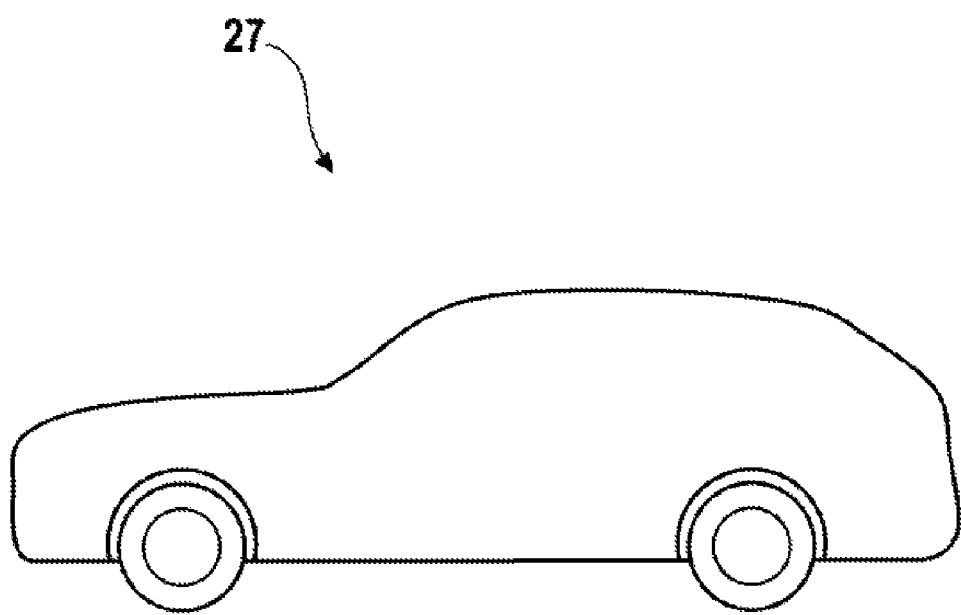
FIG. 8 shows a side view of a motor vehicle.

FIG. 3 shows in a diagram on the abscissa the displacement travel w of the piston 14 and on the ordinate the force F as a return force. The return force thus constitutes the return force applied by the spring 6 to the piston 14. The force applied by the two return springs (not shown) to the pedal 2 is not depicted in FIG. 3. The displacement travel w of the piston 14 is given in millimeters (mm) and the force F as return force in Newton (N). Between the positions A and B of piston 14 and consequently also of the pedal 2, only the return force occurs at the piston 14 which increases directly proportionally in a linear fashion as a function of the displacement travel w between A and B. The position A is a position of the pedal 2 between the rest position indicated in dotted lines and the end position, wherein in position A the pedal 2 for example has already covered around 80% of the displacement travel between the rest position and the end position. In a position of the pedal 2 between the rest position and position A, there is no contact between the piston 14 and the spring 6 (not shown in FIGS. 2 and 3). Between B and D a greater return force or force step occurs of the force applied by the spring 6 on the pedal 2. B is therefore the position of the pedal 2 or piston 14 before the intermediate position, and D is the position of the pedal 2 or piston 14 after the intermediate position of the pedal 2. In position C of the piston 14 or pedal 2, the maximum greater return force or maximum force step occurs. On a further movement of the pedal 2 after the intermediate position in the direction of the end position, after position D, again only the directly proportionally increasing return force occurs.

A force step also occurs on a return movement of the pedal 2 from the end position to position A, wherein this force step however, depending on the design form of the segments 10 and 11 of spring 6, is usually smaller and in the opposite direction. On the return movement of the pedal 2, the second segment 11 adheres slightly to the first segment 10. This adhesion is however only so weak that a return of the spring 6 to position A remains guaranteed. Independently of the spring 6, the at least one return spring (not shown) can move the pedal 6 to the rest position indicated in dotted lines. For safety reasons the pedal value sensor arrangement 1 usually has two return springs (not shown).

The slight adhesion of the pedal 2 is perceived by the driver activating the pedal 2. This slight adhesion can serve to give the driver a perceptible signal. With this signal the driver can be informed for example of an impending shift of the transmission (not shown). The driver can then decide whether or not he should lift his foot off and thus allow the shift.

FIG. 2 shows, corresponding to the positions A to D shown in FIG. 3, corresponding forms or geometries of the spring 6 in the first embodiment example for these positions of the pedal 2 or the piston 14. In positions A and B there is no contact between the first segment 10 of the spring 6 as a protuberance 9 and the second segment 11 of the spring 6. The return force provided by the spring 6 between positions A and B thus results substantially from a deformation of the spring 6 in an approximately circular segment according to the depiction in FIG. 2 to the left of the first segment 10 and below a protuberance 9 on which the piston 14 lies. The spring 6 is attached to a housing 28, shown greatly simplified in FIG. 2, and arranged in this housing 28, wherein furthermore inside the housing 28 the kinematic is also positioned. Position B of the pedal 2 or piston 14 is a position shortly before contact of the second segment 11 on the first segment 10. In position B' contact is made between the second segment 11 of the spring 6 and the first segment 10 of the spring 6, so that on a further movement after position B' in the direction of position C, because of the geometry of the protuberance 9 on the first segment 10, the second segment 11 as shown in FIG. 2 is deformed to the right and preferably the first segment 10 is deformed slightly to the left in order to allow a further downward movement of the pedal 2. Thus at the spring 6, because of the contact between the first and second segments 10, 11 of the spring 6, an additional deformation of the spring 6 occurs which causes the greater return force or force step. On further movement of the pedal 2 or piston 14 after position C in the direction of the end position, a decrease in the greater return force occurs since, because of the geometry of the second segment 11 of the spring 6, the second segment 11 can deform back again. Thus after the further movement of the pedal 2 or piston 14 in the direction of the end position, after position D, the greater return force or force step can be overcome.

The pedal value sensor arrangement 1 is furthermore provided with a device to detect the intermediate position of the pedal 2. For this at the pedal 2, at a retaining rod 22, a first electric contact element 21 is attached as an electrical contact 19 and a sensor 18. A second electrical contact element 20, also as an electric contact 19 and sensor 18, is connected with a power source 23 by means of lines so that a circuit 24 can be present. In the circuit 24 is arranged a current measurement device 25. Only in the intermediate position of the pedal 2 is there a mechanical and hence also an electrical contact between the first contact element 20 and the second contact element 21. Thus the circuit 24 is closed and current flows through this. This current can be detected by the current measurement device 25 and thus a signal sent to a control unit of the motor vehicle 24. With this shift signal or signal from this device, an automatic transmission of the motor vehicle 27 can downshift automatically to the next lower gear stage.

Figure 4:
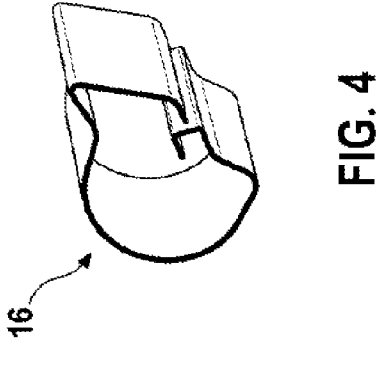
FIG. 4 is a perspective view of the spring in FIGS. 1 and 2.

FIG. 5 shows a second embodiment example of the spring 6. The spring 6 does not consist of metal as in the first embodiment example in FIGS. 2 and 4, but of a plastic, preferably a thermoplastic. The ring 16 has an undulation 30 at a part segment between the first segment 10 and the second segment 11. The undulation 30 reduces the spring constant of the spring 6 according to Hooke's law.

The undulation 30 of the spring 6 achieves that a substantially lower material strain occurs in the spring 6 compared with a spring without such an undulation. If for reasons of durability a particular material strain must not be exceeded, a spring 6 with the undulation 30 can be constructed substantially smaller than a spring without undulation. In other words the spring 6 with undulation 30 requires a smaller installation space than a spring without undulation.

FIG. 6 shows a third embodiment example of the spring 6. The spring 6 in a third embodiment example is made of two parts and comprises the spring 6 shown in the second embodiment example as a first spring 6 of plastic, and in addition an additional spring 31 as a second spring 6 of metal e.g. steel, aluminum or brass. The additional spring 29 is held at both ends in recesses 31 on the first spring 6. The additional spring 29 increases the return force of the two-part spring 6 in position C so that a greater maximum return force occurs. Furthermore if necessary the additional spring 29 can be used to support a return movement from the end position into the rest position. The first spring 6 of thermoplastic material is produced in an injection molding tool by injection molding. In order to achieve different maximum return forces or different spring constants of the two-part spring 6, different additional springs 29 can be arranged on an identical first spring 6 of plastic, so that two-part springs 6 can be made available or produced which differ only in different extra springs 29.

Overall there are substantial benefits from the pedal value sensor arrangement 1 according to the disclosure. The pedal value sensor arrangement 1 has only one spring 6 which provides both the directly proportionally increasing return force and the greater return force or force step, so that advantageously no additional components or units are required to provide a force step on the pedal 2 in the region of the intermediate position.

The invention claimed is:

1. A pedal value sensor arrangement for a motor vehicle, comprising:
a pedal movable between a rest position and an end position; and
a spring configured to apply a return force to the pedal in a direction toward the rest position, the spring including a first segment and a second segment, and the spring being formed as an interrupted ring with two ends, the first segment and the second segment being formed in a region of the two ends, and the spring being a single member, wherein:
in an intermediate position between the rest position and the end position, the spring is configured to apply a greater return force to the pedal in the direction of the rest position, the greater return force being larger than the return force applied outside the intermediate position, and
the greater return force of the spring is brought about by a contact of the first segment with the second segment.

2. The pedal value sensor arrangement as claimed in claim 1, wherein:
a geometry of the spring in the intermediate position is configured to cause an additional deformation of the spring,
the additional deformation of the spring causes the greater return force, and
the additional deformation is a deformation which differs from deformation of the spring on a movement of the spring outside the intermediate position.

3. The pedal value sensor arrangement as claimed in claim 2, wherein the geometry of the spring is configured to cause, on the contact and relative movement between the first segment of the spring and the second segment of the spring, the additional deformation of the spring.

4. The pedal value sensor arrangement as claimed in claim 2, wherein the additional deformation is a bending of the spring.

5. The pedal value sensor arrangement as claimed in claim 1, wherein the contact between the first segment of the spring and the second segment of the spring causes friction forces and the friction forces cause the greater return force.

6. The pedal value sensor arrangement as claimed in claim 1, wherein the spring is kinematically coupled with the pedal such that movement of the pedal causes the first segment of the spring to execute a relative movement in relation to the second segment of the spring.

7. The pedal value sensor arrangement as claimed in claim 1, wherein:
when the pedal is in a position between the rest position and the intermediate position, there is no contact between the first and second segments of the spring, when the pedal is in the intermediate position, contact is made between the first and second segments of the spring, and
when the pedal is in a position between the intermediate position and the end position, contact is made or there is no contact between the first and second segments of the spring.

8. The pedal value sensor arrangement as claimed in claim 1, wherein the pedal is at least one of:
mechanically coupled with the spring by a mechanism, and
mounted pivotably about a pivot axis.

9. The pedal value sensor arrangement as claimed in claim 1, wherein:
the spring is at least one spring, and
the at least one spring is at least one of (i) a leaf spring, and (ii) the only spring in the pedal value sensor arrangement.

10. The pedal value sensor arrangement as claimed in claim 1, further comprising:
a sensor configured to detect the intermediate position of the pedal.

11. The pedal value sensor arrangement as claimed in claim 1, wherein the spring at least partly includes metal.

12. The pedal value sensor arrangement as claimed in claim 1, wherein the spring at least partly includes plastic.

13. The pedal value sensor arrangement as claimed in claim 12, wherein the spring includes an undulation formed in a region of the spring located between the first segment and the second segment.

14. The pedal value sensor arrangement as claimed in claim 12, wherein an additional spring made of metal is located within a region defined by the plastic spring.

* * * * *